Feb. 22, 1944.   H. W. GILFILLAN   2,342,138
POWER TRANSMISSION
Original Filed Sept. 20, 1940   3 Sheets-Sheet 1
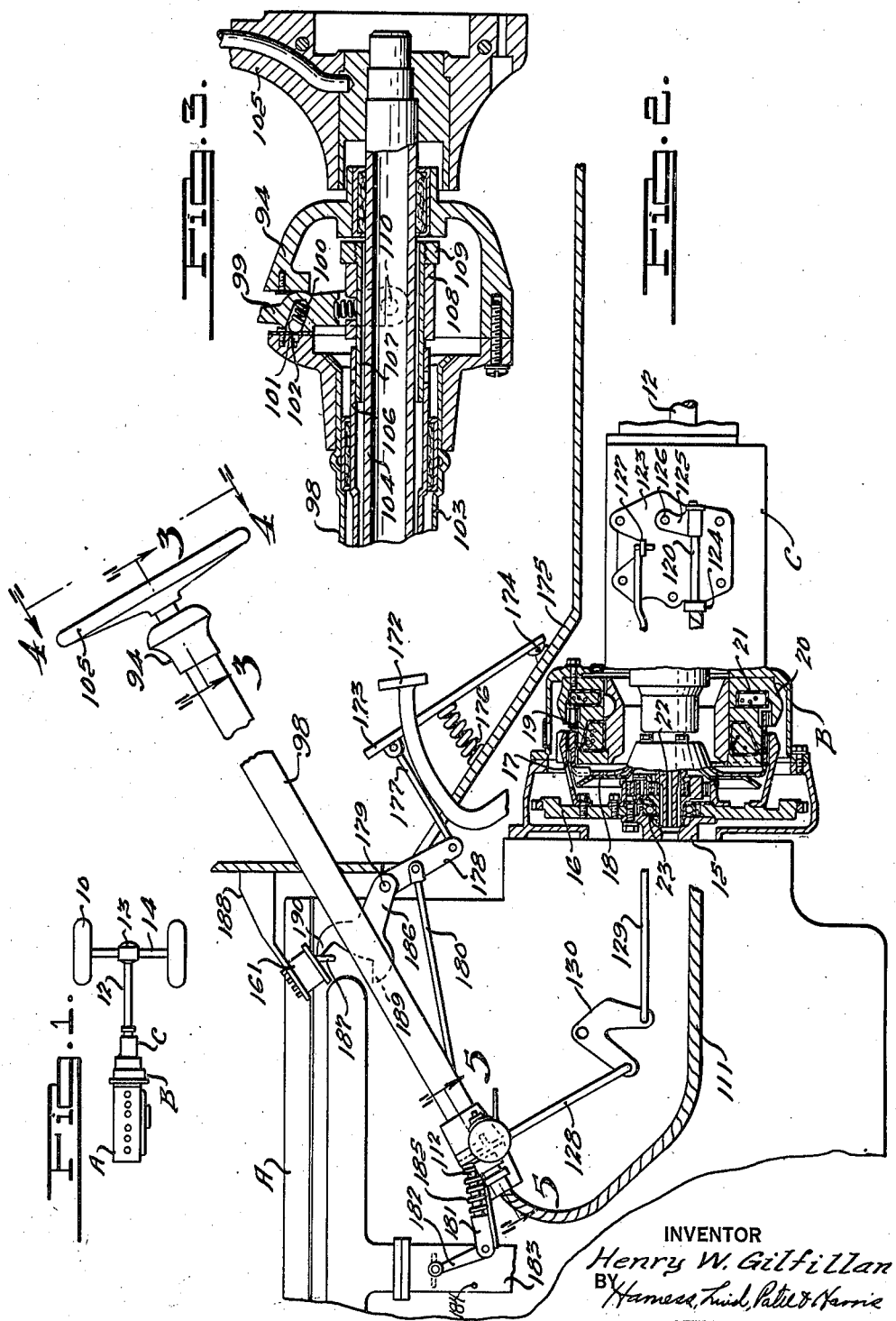
INVENTOR
*Henry W. Gilfillan*
BY *Harness, Dickey, Pierce & Harris*
ATTORNEYS.

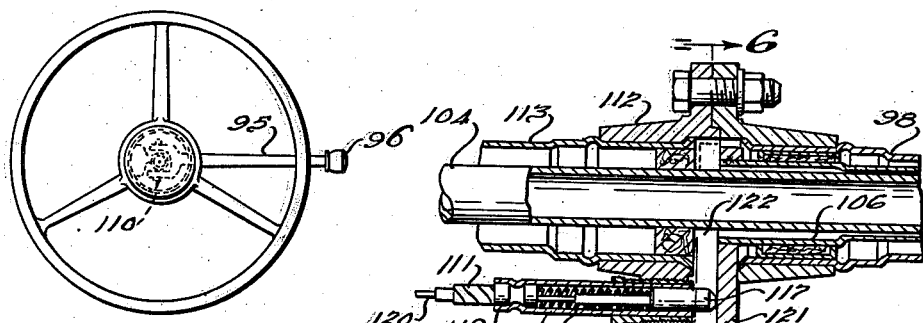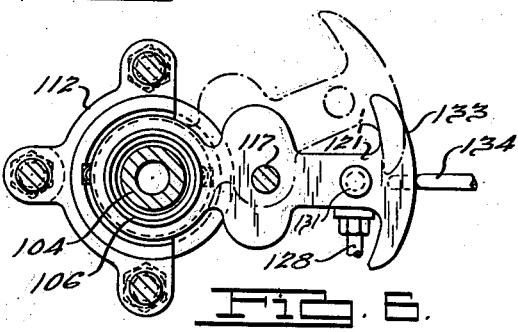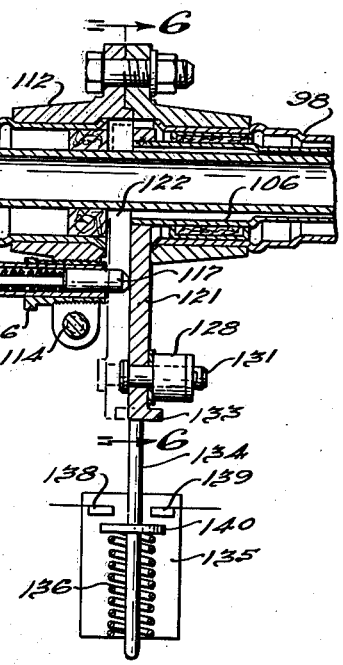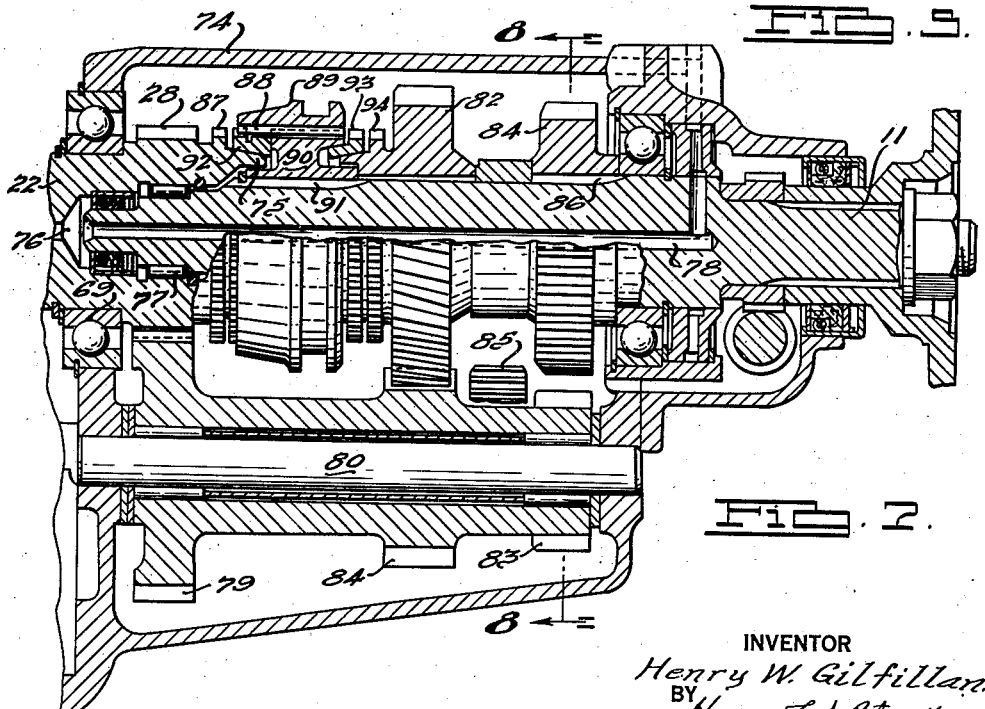

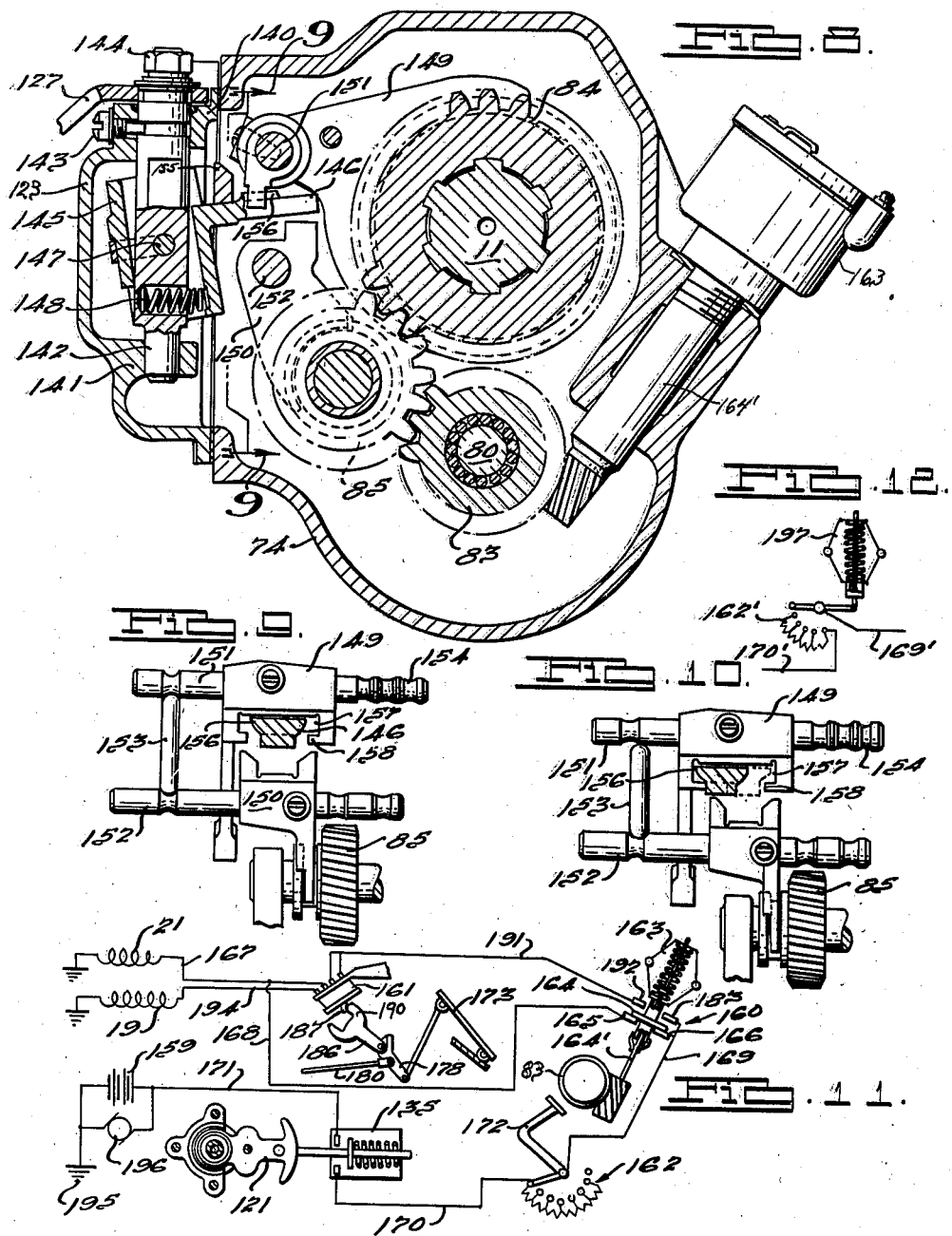

Patented Feb. 22, 1944

2,342,138

UNITED STATES PATENT OFFICE 2,342,138

POWER TRANSMISSION

Henry W. Gilfillan, Detroit, Mich., assignor to Chrysler Corporation, Highland Park, Mich., a corporation of Delaware Original application September 20, 1940, Serial No. 357,528. Divided and this application January 23, 1942, Serial No. 427,859

7 Claims. (Cl. 74—473)

This invention pertains to automotive power transmissions and this application is a division of co-pending application, Serial No. 357,528, filed September 20, 1940, by Henry W. Gilfillan and Edgar L. Bailey.

The aforesaid joint application relates to a power transmission of the electrodynamic type wherein a planetary gearset is disposed in combination with electromagnetic brake and clutch devices of the eddy current type; the arrangement being such that torque multiplication is obtained through the planetary gearset for starting and acceleration of the vehicle, the sun gear being held against rotation by operation of the eddy current brake, while the planetary gearset is locked up in one to one ratio at the end of the acceleration period by operation of the eddy current clutch, suitable control mechanism being provided.

It is the principal object of the present invention to provide in an automatic power transmission of the aforesaid type improved manual control means for the shiftable members.

Other objects and advantages of the invention will become apparent from the following description.

In the drawings which accompany the description, and which illustrates a preferred embodiment of the invention, Fig. 1 is a diagrammatic showing of the power plant and drive mechanism of a vehicle incorporating the present invention.

Fig. 2 is a side elevation of the power plant and transmission mechanism, parts being broken away to show details thereof.

Fig. 3 is a sectional view along line 3—3 of Fig. 2.

Fig. 4 is a plan view along line 4—4 of Fig. 2.

Fig. 5 is a sectional view along line 5—5 of Fig. 2.

Fig. 6 is a sectional view along line 6—6 of Fig. 5.

Fig. 7 is a longitudinal sectional view of the rear gearbox unit of the transmission.

Fig. 8 is a sectional view along line 8—8 of Fig. 7.

Fig. 9 is a diagrammatic view on a reduced scale of part of the Fig. 8 shift mechanism, the view being taken as indicated in the arrows 9—9 on Fig. 8 and the parts being shown in neutral position.

Fig. 10 is a view of the Fig. 9 parts in one of their shifted positions.

Fig. 11 is a wiring diagram of the transmission.

Fig. 12 illustrates a modification of the wiring diagram of Fig. 11.

Referring to the drawings wherein reference characters are used to designate corresponding parts referred to in the following description, Fig. 1 illustrates a typical arrangement of transmission mechanism in a vehicle embodying the present invention. The vehicle engine A is coupled to the driving wheels 10 of the vehicle through a pair of torque multiplying units B and C; the unit B consisting of an electrically controlled underdrive unit illustrated in detail in Fig. 2 and the unit C consisting of a manually controlled high, low and reverse gearbox illustrated more fully in Fig. 7. The output shaft 11 of unit C is connected by means of the usual propeller shaft 12 with the differential gearbox 13, which in turn, drives the axle shafts 14.

Referring for the moment to Fig. 2, it will be seen that the engine crankshaft 15 carries a flywheel 16 to which is fastened a driving member 17. The latter forms part of an electrical eddy current clutch which also includes a driven member 18 and a coil 19. The driven member 18 is also adapted to cooperate with an electrical eddy current brake generally designated by 20, and which includes a coil 21.

The output shaft 22 of the electrical unit is connected to the flywheel 16 by means of a planetary gearset 23 and the aforesaid driven member 18 acts as a drive control element for the gearset. The arrangement is such that when the brake coil 21 is energized, the sun gear is held against rotation and a reduction drive is transmitted from shaft 15 to shaft 22. When the clutch coil 19 is energized and coil 21 de-energized a substantially 1 to 1 ratio drive is transmitted between shafts 15 and 22.

For a more complete description of the electrical unit reference should be made to the aforesaid Gilfillan and Bailey application.

Referring now to Figs. 1 to 10, inclusive, it will be seen that the shaft 22 extends rearwardly into the housing 74 of the gearbox C in which it terminates in a cone-shaped clutch portion 75. A hollow portion 76 provides space for the roller bearing 77 which pilots the forward end of the tail shaft 11. Lubricant is circulated through the gears, bearings, etc., through suitable holes which connect with the central bore 78 of shaft 11.

The pinion 28 is the input element of the box C and meshes with a gear 79, the latter being one of a cluster rotatably carried on a countershaft 80. The cluster also includes a gear 84 which meshes with the low speed driven gear 82, and a gear 83 which is adapted to be engaged by an idler gear 85 for providing reverse drive, the gear 85 simultaneously meshing with the gear 83 and a gear 84 splined at 86 on shaft 11.

The shaft 22 is formed with a set of clutch teeth 87 which are adapted for engagement by complementary internal clutch teeth 88 formed in clutching sleeve 89, the latter being slidable on a hub 90 which is splined at 91 on shaft 11. Suitable blocker synchromesh mechanism 92 is provided to facilitate smooth and noiseless engagement of the sleeve 89 with the teeth 87. Inasmuch as any suitable type of blocker synchromesh may be used, this part of the mechanism will not be described in detail, it being deemed sufficient to briefly refer to the salient parts thereof.

A similar blocker synchromesh mechanism 93 is provided for facilitating meshing of the teeth of sleeve 89 with the clutch teeth 94 formed on low speed gear 82.

The mechanism for shifting sleeve 89 and idler gear 85 to provide two forward speeds and reverse comprises a hand actuated lever 95 (Fig. 4) having a knob 96 at the outer end thereof. The lever 95 is carried by a casing 94 which forms part of the steering column referred to generally by the numeral 98. The casing 94 has separable sections for purposes of assembly and a slot is provided for receiving a ball-shaped enlargement 99 of lever 95. The portion 99 of the lever has a bore 100 in which a spring pressed detent 101 is disposed. The detent 101 is adapted to engage in an aperture formed in the wall of the slot as shown in Fig. 3.

The steering column includes an outer tube 103 on which the casing 94 is mounted, and an inner tubular steering shaft 104 which carries the steering wheel 105. A tubular shaft 106 extends longitudinally of the column and is slidably and rotatably supported by the column structure. Mounted in the upper end of the tubular shaft 106 is a sleeve 107, which is welded thereto and extends beyond the upper extremity thereof. A collar 108 is rigidly secured in place on the shaft by a nut 109. The collar 108 is provided with bosses for receiving pins 110 which are carried by the forked inner end portion of the lever 95. The enlarged portion 99 of the lever serves as a fulcrum about which the lever may be oscillated in a vertical plane to shift the shaft 106 vertically of the steering column. The shaft 106 may be rotated about its axis which is coincident with the longitudinal axis of the steering column by swinging the lever 95 about the axis of the column.

Axial movement of the shaft 106 is transmitted to the selector mechanism in casing 74 by a Bowden wire assembly generally designated by numeral 111. One end of the Bowden assembly is mounted in the lower portion of a separable coupling 112 by means of which an extension 113 of the column housing 98 is supported. The lower element of the coupling 112 is provided with an apertured flange 114 in which a metal tube 115 is fixed by means of a threaded fitting 116. Slidably carried in the tube 115 is a plunger 117 normally urged upwardly of the column by a spring 118 which bears between the plunger and a fitting 119. A flexible cable 120 extends through the plug 119 and is attached to the plunger 117. The latter bears against a plate 121 non-rotatably fixed on the lower extremity of the shaft 106 and which extends outwardly of the coupling 112 through a slot 122 in the side thereof, the slot being approximately twice as wide as the thickness of the plate 121 for accommodating shifting thereof axially of the column.

The opposite end of the Bowden wire assembly extends to the cover plate 123 of the housing 74 where it is received by a fitting 124, the flexible cable 120 being attached to a lever 125 swingably mounted at 126. It is apparent that reciprocation of the shaft 106 will cause corresponding swinging of lever 125, the motion being transmitted by the cable 120.

Rotative movement of the shaft 106 is transmitted to a shift lever 127 by means of a pair of links 128, 129 connected by a bell crank 130, the link 128 being pivoted to the plate 121 by means of a pin 131. The plate 121 has a cam shaped portion 133 against which a plunger 134 of a switch 135 is adapted to bear. The switch has a pair of terminals 138, 139 which are adapted to be bridged by the contact member 140 upon movement of plunger 134 under the influence of spring 136 when the plate 121 is in certain positions as will be more fully explained.

The cover 123 (Fig. 8) is provided with a pair of aligned bosses 140A, 141 in which is mounted a rock shaft 142, a set screw 143 holding it against displacement. The shift lever 127 is operatively secured on the top of the rock shaft by a nut 144.

Rockably mounted on shaft 142 is a trunnion element 145 having an integral shift finger 146. The element 145 is rockable about a mounting pin 147 and is biased to the position illustrated by a coiled compression spring 148.

The sleeve 89 and gear 85 are shifted by a pair of shifter forks designated 149 and 150 respectively, these forks being carried by a pair of shiftable rails 151 and 152. The rails are provided with the usual interlocking plunger 153 and detent receiving grooves 154 as illustrated diagrammatically in Figs. 9 and 10.

The shift finger 146 is normally maintained in engagement with the fork 149 by the spring 148, thus the shift mechanism is normally conditioned for effecting a shift of the sleeve 89 upon swinging of the lever 95 about the axis of the steering column. In order to shift the reverse gear 85 it is necessary to disengage the finger 146 from the fork 149 and engage it with the fork 150 which is accomplished by rocking the lever 95 upwardly resulting in downward movement of plate 121 to the dotted line position of Fig. 5. This movement of the plate 121 transmits a push to selector lever 125 through the Bowden cable 120. The selector lever 125 is connected inside the casing 74 by means not shown with a lever 155 which is adapted to push downwardly on finger 146 in response to counterclockwise swinging of lever 125, thereby rocking trunnion member 145 about the pin 147 and against the compression of spring 148. The finger 146 is thereby disengaged from fork 149 and engaged with fork 150 and swinging of the lever 95 away from the driver will rock shaft 142 about its axis and shift idler gear 85 into mesh with gears 83 and 84. Upon return of lever 95 to neutral position, spring 148 will return the parts to the position shown in Fig. 8 and the shift mechanism will again be conditioned for shifting sleeve 89 into engagement with direct drive clutch 87 or low speed drive clutch 94 depending upon the direction of swing of lever 95.

From Figs. 8, 9 and 10 it may be seen that the portion 156 of the shift finger 146 which engages the fork 149 is cam shaped and the slot 157 of the fork which receives the portion 156 is large enough to permit a considerable amount of lost motion of finger 146 before the fork is shifted. This is for the purpose of permitting the lever 95 to be moved back to neutral position from high or low speed position without necessarily moving the sleeve 89, thereby opening the switch 135 (because of the action of the cam 133) without disturbing the position of the sleeve 89. If, however, it is desired to shift into reverse from high speed for example, which action cannot be accomplished until rail 151 is returned to neutral because of interlock pin 153, see Fig. 10, movement of finger 146 downwardly will automatically cause rail 151 to be returned to neutral because of the engagement of the cam portion of the finger 146 with the right hand projection 158 of fork 149. These projections are provided in each side of slot 157 as illustrated and function to return rail 151 to neutral whenever the finger 146 is moved to engage the fork 150. This operation will be more fully explained below.

Referring now to Fig. 11, it may be seen that field coils 19 and 21 are connected to the vehicle battery 159 through a plurality of control instrumentalities which include a governor controlled switch 160, an accelerator operated switch 161 and a pedal operated rheostat switch 162, in addition to the aforementioned switch 135 which is operated by the plate 121.

The switch 160 is operated by a governor mechanism 163 of any suitable type driven by a shaft 164' from the countershaft cluster gear 83, and is provided with two sets of terminals adapted to be bridged by a conductor element 164. When the switch 160 is in low speed condition, as in Fig. 11, underdrive coil 21 is connected to battery 159 through wires 167, 168, element 164, wire 169, switch 162, wire 170, switch 135 and wire 171. The rheostat switch 162 is operated by a pedal 172, which is equivalent in its operation to a conventional clutch pedal. The switch is "on" when the pedal 172 is released and "off" when the pedal is fully depressed, intermediate positions of the pedal causing varying amounts of resistance to be introduced into the circuit as can be readily understood from Fig. 11.

When switch 160 is in high speed position, coil 21 may also be energized through switch 161 which is operated by the accelerator pedal 173. The latter is pivoted at 174 to the vehicle floor board 175 and is urged to throttle closed position by spring 176. A link 177 connects the pedal with a lever 178 pivoted at 179 to the lower surface of the floor board. A link 180 transmits swinging motion of lever 178 through a suitable lost motion connection 181 to a throttle valve control lever 182. The latter is adapted to be swung about its pivot until it engages the stop 184 carried by carburetor riser 183 at which position the throttle valve is wide open. The pedal 173, lever 178 and link 180 are then adapted to have further movement overtraveling wide open throttle valve position which is permitted by compression of the spring 185 of the lost motion connector 181. This overtravelling movement operates to swing lever 186, which is fixed to lever 178, far enough for finger 189 thereof to engage the operating finger 187 of switch 161 whereupon the switch is closed, thereby completing a circuit from coil 21 to battery 159 through wires 167, 191, terminals 192, 193 of switch 160, wire 169, switch 162, wire 170, switch 135 and wire 171.

Whenever switch 161 is closed by the aforesaid overtravel movement of pedal 173, it stays closed until the pedal is returned substantially to throttle closed position. This is due to the fact that switch 161 is of the snap-over type and finger 190 of lever 186 is purposely positioned so that it will not engage the switch operating finger 187 until the accelerator pedal 173 is fully released. Operation of switch 161 by overtravel operation of the accelerator pedal is commonly referred to as "kickdown" operation.

The switch 161 is of the double pole, double throw type and when it is open with respect to underdrive coil 21 it is closed with respect to direct drive coil 19. The latter is connected to the battery 159 through wire 194, switch 161, wire 191, switch 160, wire 169, switch 162, wire 170, switch 135 and wire 171. The battery is grounded at 195 and is shunted by the usual generator 196.

Fig. 12 illustrates a modification of the Fig. 11 control circuit, wherein the circuit is altered by substituting a governor controlled rheostat switch 162' for the pedal controlled switch 162. In the Fig. 12 modification, the switch 162' is exactly the same in construction and operation except that it is automatically operated by a governor 197. The latter is intended to be driven by the engine A in any suitable manner, for example, by the generator drive shaft, and functions to open the circuit between wires 169' and 170' gradually when the vehicle comes to a stop and to gradually energize coil 21 when the vehicle is started.

If desired as a safety feature, the regular vehicle ignition switch may be inserted in the circuit of coils 19 and 21 to thereby render the circuits thereto dead unless the ignition switch is "on." This feature is omitted from the drawings for the sake of simplicity.

In describing the operation of the drive, let it be assumed that the vehicle is at rest with the engine A idling and the gear shift lever 95 in neutral position. In order to start the vehicle for forward travel, gear shift lever 95 is swung about the axis of the steering column 98 away from the driver, which action causes the sleeve 89 to be moved rearwardly of Fig. 7 to thereby mesh the teeth thereof with clutch teeth 94 of low speed gear 82. At the same time the accompanying movement of plate 121 permits plunger 134 of switch 135 to move upwardly of Fig. 5 under the influence of spring 136, thereby to bridge switch terminals 188, 189. The cam 133 of plate 121 is so designed that the plunger 134 of switch 135 will be held in switch-open position until the plate 121 has been swung sufficiently to fully engage the sleeve 89 with the clutch teeth 94 or the clutch teeth 87, as the case may be. This feature makes it possible to shift the sleeve 89 without clashing of teeth and without the necessity of depressing pedal 172.

Shifting of sleeve 89 then into low speed position causes switch 135 to close, thereupon energizing underdrive coil 21 through wires 167, 168, terminals 165, 166 of switch 160, wire 169, switch 162, wire 170, switch 135 and wire 171. Under these conditions, the rheostat switch 162 is in the Fig. 11 position with all of the resistance cut out of the circuit and the governor controlled switch 160 is in the Fig. 11 position with the movable conductor member 164 bridging the terminals 165, 166 thereof.

Depression of the accelerator pedal 173, therefore, will cause the vehicle to be accelerated in a forward direction with the electrical unit B operating in underdrive and the manual gear box C operating in its low speed position. When the vehicle has been accelerated to a speed of approximately 7 M. P. H. the governor mechanism 163 will operate to open the circuit between terminals 165 and 166 of switch 160 and close the circuit between terminals 192 and 183 thereof. This action of governor 163 will cause underdrive coil 21 to be de-energized and direct drive coil 19 to be energized through wire 194, switch 161 (which is in closed position with respect to coil 19), wire 191, switch 160, wire 169, switch 162, wire 170, switch 135 and wire 171. The underdrive mechanism B is now operating in direct drive with the planetary gear set 23 substantially locked up in one to one ratio. This corresponds to second speed position in conventional transmission mechanisms.

Direct drive in gear box C corresponding to third speed position in conventional transmission mechanisms, may now be obtained by swinging gear shift lever 95 about the axis of the steering column toward the driver. As the lever 95 is swung backwardly, the plate 121 moves plunger 134 of switch 135 to switch open position, thereby de-energizing both direct drive coil 19 and underdrive coil 21. At the same time sleeve 89 is moved out of engagement with clutch teeth 94 and into engagement with clutch teeth 87, thereby stepping up the drive ratio in gearbox C. Inasmuch as both coils 19 and 21 were de-energized by the action of the cam 133 during the time that the shift of sleeve 89 was being made, the load was relieved momentarily from the shaft 22, thereby permitting the sleeve 89 to be shifted without the necessity of depressing pedal 172. When the shift lever 95 reaches the extremity of its movement to high speed position, which, it would be pointed out, includes the movement necessary to take up the lost motion on finger 146 with respect to slot 157 of shift fork 149, plunger 134 of switch 135 is again permitted to move to switch closed position under the action of the spring 136 and underdrive coil 21 is again energized. Governor operated switch 160 having again returned to its low speed position during idling of engine A, the vehicle is now in underdrive in unit B and in direct drive in gearbox C. This corresponds to third speed position in conventional transmissions.

The car may now be accelerated to a speed of approximately 18 M. P. H. when governor mechanism 163 will operate to open the circuit between terminals 165, 166 of switch 160 and close the circuit between terminals 192, 183 thereof, whereupon underdrive coil 21 will be de-energized and direct drive coil 19 will be energized in the manner explained above. The governor mechanism 163 operates at a higher vehicle speed when gearbox C is in high speed position due to the fact that the governor is driven from countershaft cluster gear 83 which, of course, rotates slower when gearbox C is in high speed position for a corresponding car speed, the difference in speed being in accordance with the step-up in ratio. The vehicle under these conditions is being driven in direct drive in both units B and C, this condition being equivalent to overdrive in conventional transmissions. It is intended to provide a rear axle ratio of approximately 3.2 to 1, thereby obtaining the advantages usually obtained by the use of an overdrive mechanism.

With such a rear axle ratio it is, of course, obvious that the accelerating characteristics of the car will be sluggish and provision is made for an instantaneous return to under drive in unit B when rapid acceleration is desired as, for example, when passing cars at speeds above the operating speed of governor 163 or when climbing hills.

Return to underdrive in unit B is accomplished by kickdown operation of accelerator pedal 173. Depression of the said pedal beyond wide open throttle position compresses the spring 185 of the lost motion connection 181 and permits movement of lever 178 sufficiently to swing lever 186 to such position that the finger 189 thereof engages the operating finger 187 of switch 161. Movement of the finger 187 de-energizes the direct drive coil 19 by opening the circuit between wires 194 and 191 and at the same time energizes underdrive coil 21 through wires 167, 191, terminals 192, 183 of switch 160, wire 169, switch 162, wire 170, switch 135 and wire 171. After the vehicle has been accelerated to the desired speed, return to direct drive condition is made by releasing accelerator pedal 173 which will return to throttle closed position under the influence of the spring 176 whereupon the finger 199 of lever 186 will engage the operating finger 187 of switch 161 to thereby open the circuit between wires 194 and 191 and close the circuit between wires 167 and 191.

When the vehicle is brought to a stop, the governor mechanism 163 will operate at a speed of approximately 10 M. P. H. to open the circuit between terminals 192, 183 of switch 160 and close the circuit between terminals 165, 166 thereof. This will cause unit B to return to underdrive condition of operation and the vehicle may be brought to a stop by application of the brakes with the gear shift lever 95 remaining in high speed position. The governor mechanism 163 operates to return the unit B to underdrive condition at a slower speed than is the case when the change is made from underdrive to direct in unit B because of the lag which is inherent in most governor mechanisms when speed thereof is reduced. This condition is a desirable one because is it not desired to change to underdrive in unit B at a speed higher than approximately 10 M. P. H. In some cases it might be desirable to further reduce this speed in order that change to underdrive in unit B will not take place every time the vehicle is slowed down in traffic unless it is slowed down to an extremely slow speed which requires the use of the underdrive mechanism to obtain a smooth pick up to cruising speed.

If the vehicle remains at rest with the gear shift lever 95 at high speed position, there will be a creeping tendency due to the fact that coil 21 remains energized and the amount of torque developed by the engine at idling speed thereof is being transmitted to the tail shaft 11. This creeping tendency may be overcome by moving the gear shift lever 95 to neutral position thereupon de-energizing coil 21 through the action of the switch 135. This last action may be accomplished without disengaging sleeve 89 from clutch teeth 87 because of the movement of the finger 146 permitted in the slot 157 of the fork 149 without causing shifting movement of the fork 149 or rail 151. Thus the vehicle may remain at rest with the rear gearbox C in direct drive condition and the coils 19 and 21 de-energized. The vehicle may be started from rest simply by movement of the gear shift lever 95 to high speed position, which action is accomplished quickly and easily by a flick of the finger whereupon coil 21 will be energized and the vehicle may be accelerated smoothly with the unit B operating in underdrive and the unit C in direct drive. When predetermined speed has been reached a change to direct drive in unit B will be accomplished by operation of the governor switch 160, as described above.

The car may also be held at rest without creep with the sleeve 89 engaged and the gear shift lever 95 in high or low speed position by depressing the pedal 172 to the extent of its movement whereupon the switch 162 will be opened and the coil 21 de-energized. Switch 162 is particularly useful when the car is being maneuvered at relatively slow speeds, for example as when parking. By manipulation of pedal 172 the resistance in the electrical circuit may be varied as desired and an effect similar to feathering of a friction clutch may be obtained.

Reverse operation of the vehicle is obtained by moving the gear shift lever 95 to neutral position and rocking it upwardly of the steering column, thereby to move the shift finger 146 out of engagement with fork 149 and into engagement with fork 150. If sleeve is in either of its engaged positions, it will be automatically cammed back to neutral position by the action of the cam shaped portion 156 of the finger 146 during its movement into engagement with the fork 150. After the finger 146 has been engaged with the fork 150, swinging of the gear shift lever 95 counterclockwise of the steering column axis will move the idler gear 85 rearwardly of Fig. 7 and into mesh with gears 83 and 84, thereby establishing reverse drive condition in gearbox C. The operation of the underdrive mechanism B is exactly the same in reverse as for forward speeds and a two speed reverse operation may be obtained in the same manner except that the car speed at which the governor 163 operates will be somewhat lower due to the fact that the reverse drive ratio is relatively low.

When the control mechanism is modified by the substitution of an engine driven governor in place of the pedal 172 as is illustrated in Fig. 12 of the drawings, the operation of the mechanism is substantially the same for all conditions of operation except that the underdrive coil 21 is gradually energized by operation of the governor 197 upon speeding up of the vehicle motor and is gradually de-energized by operation of the governor when the vehicle is brought to a stop. When the vehicle is at rest, the switch 162' will be open, the governor 197 being adjusted so that this will occur at idling speed of the engine, and thus an automatic no-creep condition is achieved.

Thus it may be seen that I have provided an improved transmission mechanism which is simple in construction and operation and which does not require the acquisition of new driving technique. While only one of the many possible embodiments of the invention has been illustrated and described in this application, it is desired to point out that those skilled in the art will readily perceive that many variations in the mechanism are possible without departing from the spirit of the invention. It is therefore not desired to limit the invention in its broader aspects to the mechanism shown and described herein, except as set forth in the claims appended below.

I claim:

1. In a change speed transmission mechanism having a pair of members adapted for shifting to establish a plurality of drives of different speed ratios and directions, a shifter element adapted for selective engagement with said members; an enlarged slot in one of said members for receiving said element with sufficient clearance to permit shifting of said element back to neutral position without disturbing a selected speed ratio setting of said member; a slot in the other of said members for receiving said element; and means operatively associated with said element for compelling return of said first member to neutral upon movement of said element from neutral position to engage said other member.

2. In a change speed transmission mechanism having a pair of members adapted for shifting to a plurality of positions from neutral thereby to establish a plurality of drives of different speed ratios and directions, a shifter element; a slot in each of said shiftable members for operably receiving said element; one of said slots providing sufficient clearance to permit return of said element to neutral without disturbing a speed ratio-establishing setting of the respective member; a cam portion formed on said shifter element; and projections formed on said last member and adapted for engagement by said cam portion upon the movement of said element out of said slot whereby said member is cammed back to neutral position.

3. In a vehicle transmission, a pair of members adapted for selective shifting to provide a plurality of speed ratio drives; a shift element adapted for rocking in one plane to selectively engage said members and for rocking in a second plane to shift the members; a slot in each of said members for receiving said element, one of said slots being elongated such that when the member having the same is engaged by said element the latter may be returned to neutral position while the engaged member remains in a shifted position; and means operable in response to rocking of the element to engage the other of said pair of members for compelling return of the first of said pair of members to neutral position.

4. In a vehicle transmission, a pair of members adapted for selective shifting to provide a plurality of speed ratio drives; a shift element adapted for rocking in one plane to selectively engage said members and for rocking in a second plane to shift the members; a slot in each of said members for receiving said element, one of said slots being elongated such that said element may be returned to neutral position while the engaged member remains in a shifted position; and cam means carried by said element for camming said engaged member back to neutral position in response to rocking of said element in said one plane.

5. In a change speed transmission mechanism having a pair of members adapted for shifting from an initial position to a secondary position thereby to establish a plurality of speed ratio drives, a shifter element, means on one of said members for operably receiving said shifter element, a slot on the second of said members for operably receiving said shifter element, said slot providing sufficient clearance to permit return of said shifter element to the initial position of said second member following shift of said second member to its secondary position, and while said second member remains in its speed ratio establishing setting in said secondary position, and cam means on said shifter element and second member engageable upon movement of said shifter element out of said slot, for compelling return of said second member to its initial position before shifting of said first member by said shifter element.

6. In a change speed transmission mechanism, first and second shiftable members adapted for selective shifting from an initial position to a secondary position to provide a plurality of speed ratio drives, a third member for selectively engaging said first and second members for shifting the same, means mounting said third member for movement in a plane to engage the shiftable members and in another plane when shifting said shiftable members, one of said first and third members having spaced portions defining a slot for receiving the other of said first and third members upon movement of said third member in its plane of engaging movement to engage said first member, one of said spaced portions on the member defining said slot coacting with a portion of said other member upon movement of said third member in its plane of shifting movement to shift said first member to its secondary position to establish a drive setting in said position, and the other of said spaced portions being spaced such a distance from the first mentioned spaced portion to accommodate return of said third member to its plane of engaging movement while the said first member remains in its said drive establishing setting, said other spaced portion including means coacting with another portion of said other member in response to movement of said third member in its plane of engaging movement to engage said second shiftable member, for compelling return of said first shiftable member to its initial position before shifting the second shiftable member.

7. In a change speed transmission mechanism a member adapted for shifting from a first position to a second position to establish a predetermined speed ratio drive, a shift element mounted for movement in a plane between said first and second positions and in an intersecting plane between said first position and a third position, means establishing a lost motion connection between said member and shift element during movement of said member and shift element between said first and second positions, said connection providing for shifting of said member by said shift element from said first to said second position and for return of said shift element to said first position without disturbing the drive establishing setting of said member in said second position, and engageable means on said member and shift element for compelling return of said member to said first position upon movement of said shift element in said intersecting plane from said first to said third position following said return of said shift element from said second to said first position.

HENRY W. GILFILLAN.